United States Patent
Jones et al.

(10) Patent No.: US 6,839,490 B2
(45) Date of Patent: Jan. 4, 2005

(54) METHOD OF MAKING SEQUENTIAL COUPLER ARRANGEMENTS AND RESULTING DEVICES

(75) Inventors: Julian Kelly Jones, Maidstone (GB); Nick Sleeman, Torquay (GB); John Roderick Lincoln, Totnes (GB)

(73) Assignee: JDS Uniphase Corporation, San Jose, CA (US)

( * ) Notice: Subject to any disclaimer, the term of this patent is extended or adjusted under 35 U.S.C. 154(b) by 302 days.

(21) Appl. No.: 10/187,620

(22) Filed: Jul. 3, 2002

(65) Prior Publication Data

US 2003/0012506 A1 Jan. 16, 2003

Related U.S. Application Data

(60) Provisional application No. 60/303,805, filed on Jul. 10, 2001.

(51) Int. Cl.[7] .............................................. G02B 6/26
(52) U.S. Cl. ........................................ 385/43; 385/96
(58) Field of Search ........................... 385/39–43, 95, 385/96

(56) References Cited

U.S. PATENT DOCUMENTS

| | | | |
|---|---|---|---|
| 4,360,248 A | 11/1982 | Bickel et al. ............ | 350/96.16 |
| 4,836,644 A | 6/1989 | Eisenmann et al. ...... | 350/96.16 |
| 4,869,570 A | 9/1989 | Yokohama et al. ...... | 350/96.15 |
| 5,074,634 A | 12/1991 | Takahashi ................ | 359/127 |
| 5,166,994 A | 11/1992 | Stowe et al. ............. | 385/48 |
| 5,642,447 A | 6/1997 | Pan et al. ................. | 385/31 |
| 5,966,484 A | 10/1999 | Yuuki ....................... | 385/43 |
| 6,023,542 A | 2/2000 | Pan et al. ................. | 385/24 |
| 6,167,171 A | 12/2000 | Grasis et al. ............. | 385/24 |
| 6,385,373 B1 | 5/2002 | Doerr et al. ............. | 385/46 |
| 2002/0168143 A1 * | 11/2002 | Sasaki ...................... | 385/43 |

FOREIGN PATENT DOCUMENTS

| EP | 2 199 418 | 7/1988 | ............ G02B/6/26 |
|---|---|---|---|
| EP | 2 251 957 | 7/1992 | ............ G02B/6/26 |

* cited by examiner

*Primary Examiner*—Hemang Sanghavi
(74) *Attorney, Agent, or Firm*—Allen, Dyer, Doppelt, Milbrath & Gilchrist, P.A.

(57) ABSTRACT

A monolithic sequential coupling arrangement has two or more fused biconic couplers joined with one common optical fiber which is not spliced. The couplers are close together in a space-saving relationship exhibiting a relatively low polarization dependent loss. The non-fused fiber portions in the arrangement have each at least one adiabatic taper.

13 Claims, 1 Drawing Sheet

METHOD OF MAKING SEQUENTIAL COUPLER ARRANGEMENTS AND RESULTING DEVICES

RELATED APPLICATIONS:

This application claims priority from US provisional application 60/303,805 filed Jul. 10, 2001.

TECHNICAL FIELD

This invention relates to fiberoptic couplers and combiners, and more particularly to such couplers arranged in a sequence or a cascade.

BACKGROUND ART

In fiberoptic communication terminology, couplers are passive devices that connect three or more optical waveguide ends to split signals from one or more inputs to one or more outputs. Couplers may be made using fiber or planar waveguide technology. Combiners are devices by which the light signals from more than one input fiber or waveguide are combined into a single output fiber or waveguide. The term "coupler" will be used hereinafter to denote both types of devices.

The present invention is primarily adaptable to fiber couplers and combiners, and to fused biconic tapered couplers, i.e. couples of the type wherein two or more fibers are fused together and elongated, without the use of an outer protective glass tube.

It is known to arrange optical couplers or combiners into a cascaded array. Such array is illustrated and described e.g. in U.S. Pat. No. 6,023,542 issued Feb. 8, 2000 and assigned to the assignee of the present invention.

In order to arrange two or more couplers in a sequence, two or more couplers are prepared separately and are then spliced. This process results in an array, or a cascade, of couplers, that has a relatively large dimension caused by the "pigtails", or lengths of optical fibers that are an integral part of a coupler after manufacturing. Conventionally, one tries to isolate fibers not used in forming a particular coupler, away from the heat source used to fuse that coupler. The fibers are usually bent away from the heat source. This imposes a certain length for the pigtails and a resulting distance between two sequential couplers.

It is desirable to reduce the dimension of an array or cascade of couplers and eliminate the loss concomitant with splicing. It is also desirable to provide a monolithic device consisting of more than one fused biconic coupler on one substrate.

Fiber couplers may form part of Mach-Zehnder type interferometers wherein two fibers are fused into a coupler at one end and at the other end of the interferometer. The two couplers are thus connected by two fibers. The two ends may be spaced by only a small distance, say in the order of a few centimetres or even less. Another known possibility is a tree (1×N) coupler or a star coupler where more than two fibers are fused into a coupler. These couplers can of course be spliced to form a cascade or array of couplers.

SUMMARY OF THE INVENTION

According to the invention, there is provided a coupler arrangement comprising two optical couplers connected directly with only a single optical fiber. In one embodiment, the arrangement has at least three optical fibers of which less than all, but at least two fibers are fused to form a first coupler and less than all the fibers extending from the coupler are fused to form a second coupler with at least one fiber unused in the first coupler.

The first and second coupler can be formed a short distance away.

It has been found that the at least one "loose" fiber unused in one of the couplers but disposed in the vicinity of the fibers forming that coupler does not have to be isolated, or bent away, from the heat source used to fuse the first coupler. The heat causes the formation of an adiabatic taper on the loose fiber. The taper remains on the loose fiber (or fibers) in the finished coupler arrangement without significant adverse effect on the performance of the arrangement.

In accordance with the invention, a method of making a coupler arrangement comprising two optical couplers in sequence or a cascade, the method comprising:

a) providing at least three optical fibers in close adjacent co-extensive relationship b) fusing at least two of the optical fibers, fewer than the original number thereof, to form a first fused coupler, while allowing at least one remaining non-fused fiber to undergo heating together with the at least two fibers to be fused, the heating of the non-fused fiber resulting in an adiabatic taper, c) fusing one of the output fiber ends with the non-fused remaining fiber of step b).

For the purpose of the present specification, the following definitions are used throughout:

"monolithic" denotes a splice-free arrangement, typically disposed in a single primary housing;

"coextensive" means extending essentially in the same general direction, not necessarily parallel, juxtaposed or contiguous;

"adiabatic taper" means a narrowed cross-section of optical fiber where the mode(s) undergo local distortion but no significant loss of light energy takes place;

"close relationship" of the fibers denotes an arrangement where the fibers are close enough to undergo simultaneous heating in a fusing device (e.g. a crucible) but not in physical contact so that fusing is prevented. In embodiments of the invention, the "close relationship" implies a spacing in the range of 100 microns–5 mm, typically 125–400 microns.

BRIEF DESCRIPTION OF THE DRAWINGS

The invention will now be described in more detail by way of the following description in conjunction with the drawings, in which.

DETAILED DESCRIPTION OF EMBODIMENTS OF THE INVENTION

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
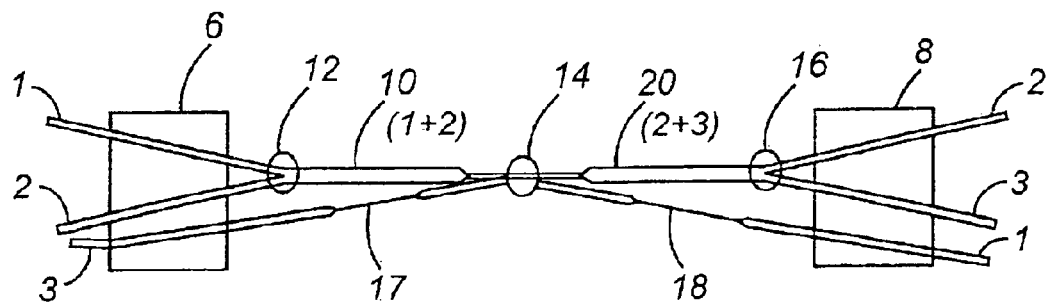
FIG. 1 illustrates a simplified manufacturing set-up of a sequential coupler arrangement of the invention.

Referring now to FIG. 1, a set-up for making an exemplary coupling arrangement of the invention has two drawing clamps 6, 8. Optical fibers 1, 2 and 3, stripped of their protective plastic coating, are arranged in the clamp 6 such that their mounted ends are spaced about 125–400μ from an adjacent fiber. This close relationship enables all the three fibers to undergo simultaneous heating in a crucible, not shown in the drawing. Fibers 1 and 2 at their left-hand portions, are wrapped (plaited) a few times around each other. A bead of an adhesive 12 is applied at one end of the twisted region to help prevent unwanted fibre movement when the fibres are heated and softened. Such movement could lead to micro-bending light loss.

Another bead 14 of the adhesive is applied at a point between the first coupler and a second coupler 20 to keep all the fibers 1, 2, 3 together and prevent their separation between the couplers. Another bead 16 of adhesive is applied at the end of the second couple 20 for the same reason as the bead 12.

The wrapping (plaiting) of the fibers around each other may be imparted on both of the fibers, whereby both fibers undergo bending, substantially avoiding torsional force on either fiber. The plaiting results in a number, preferably from 2 to 10, more preferably 3–6, of so-called cross-overs of the fibers.

It should be noted that plaiting the fibres is not essential and it is also possible to effect "parallel" fusion where fibres are held in intimate contact (clamped) along the coupler length but not twisted.

The first coupler 10 is formed by heating and applying tension (pulling apart) to fibers 1 and 2, twisted around each other. Since the fiber 3 is placed in the drawing clamp in a close vicinity of the fiber 2, as shown in FIG. 1, and secured to the two fibers 1 and 2 at the point 14 (adhesive), the heating and pulling applied to fibers 1 and 2 causes the "loose" fiber 3 to melt and form a taper in an area 17 co-extensive with the first coupler 10. This tapered-out area of the fiber 3 has been found not deleterious to the transmission of light therethrough as long as care is taken to produce a satisfactory FBT coupler 10.

Following the formation of the first coupler 10, heating and tension is applied to a second pair of fibers, 2 and 3 to form a second coupler 20. The spacing between the proximate ends of the two couplers 10 and 20 may be in the order of a few millimetres, typically in the range of 0–5 mm, the minimum being limited by the application of the adhesive bead 14 and the need to route one (or more) fibers from one coupler and into the other coupler.

It will be noted that the first coupler 10 is formed from two fibers 1 and 2, as shown in FIG. 1. Subsequently, fiber 1 is routed out of the first coupler and the second coupler is formed from fibers 2 and 3, fiber 3 being the "loose", non-fused fiber during the formation of first coupler 10. As a result, couplers 10 and 20 are optically coupled via only a single fiber 2, or in other words, have only one fiber in common.

The spacing of fibers 1, 2 and 3 during the fusing of the second coupler 20 is similar as the spacing of fibers during the formation of the first coupler 10, discussed above. Consequently, the fusing of coupler 20 causes the heating, melting and tapering of the "loose" (non-fused) fiber 1 in an area 18 approximately co-extensive with the position of the second coupler 20, the area determined of course by the placement of the crucible or another heating device.

The tapers on the non-fused fibers are termed "adiabatic" tapers i.e. tapers that do not incur any significant amount of light energy when an optical signal is transmitted through the taper.

It is a feature of the invention that each fiber in the coupling arrangement is either formed into a tapered coupler (a FBT coupler) or an adiabatic taper or both.

It is also a feature of the invention that each coupler is formed of two or more fibers and some, but never all, fibers from one coupler are used to form one or more subsequent couplers.

Figure 2:
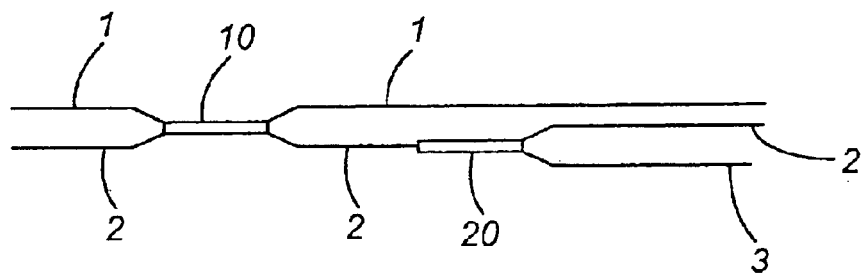
FIG. 2 illustrates an exemplary sequential arrangement with two 2×2 couplers.

FIG. 2 shows a sequential coupler arrangement formed in a set-up of FIG. 1, where one of the pigtails of the second coupler 20 has been removed as redundant. As a result, the arrangement of FIG. 2 has a 2×2 coupler 10 and a 1×2 coupler 20. Again, couplers 10 and 20 have just one fiber 2 in common.

As will be appreciated by those familiar with the art, the invention provides a so-called monolithic, splice-free, coupling arrangement with very little separation between the couplers. Such separation, as explained above, would be necessary according to the prior art to deliberately bend fibers not used in forming a particular coupler away from the heat source used to fuse that coupler.

The amount of tension, the fusing temperature and the number of twists are details well known to those familiar with the art and need not be discussed in detail. For example, the tensile force during the heating is 1–2 gms, the load being continuously monitored.

Figure 3:
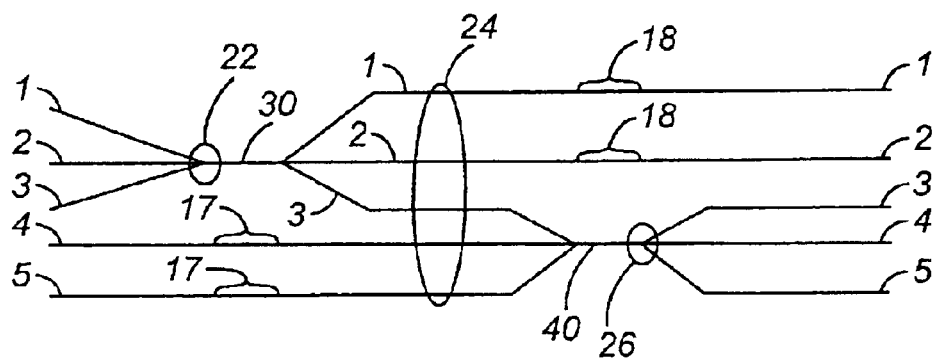
FIG. 3 shows an exemplary arrangement with two 3×3 couplers.

FIG. 3 illustrates another exemplary set-up according to the invention, one in which two 3×3 couplers are formed according to the same principles as discussed above. Fibers 1–5 are mounted to two drawing clamps, not shown in FIG. 3. Adhesive beads 22, 24 and 26 are applied, respectively, to one (left-hand) end of the twisted region of a first 3×3 coupler 30, to an area between the first coupler 30 and a second 3×3 coupler 40 (joining all the fibers 1–5 into a bundle) and to the second (right hand) end of the twisted region of the second coupler 40. The area of the bead 24 is shown schematically with the fibers spaced, while in reality the fibers are joined in a bundle with the adhesive. The couplers 30 and 40 have only fiber 3 in common. Adiabatic tapers are formed, due to close relationship of the fibers 1–5 at the drawing clamps, on all the non-fused fibers in areas co-extensive with the couplers.

Polarization dependent loss (PDL) is an important consideration when assembling optical networks. While PDL in combined devices is not a simple additive quantity, it has been found that PDL in the monolithic arrangement according to this invention is lower than the sum of PDL of prior art individual couplers joined by splicing.

While embodiments of the invention have been described and illustrated herein, various alternatives, modifications and equivalents may occur to those skilled in the art. Therefore, the above description should not be taken as limiting the scope of the invention which is defined by the metes and bounds of the appended claims.

What is claimed is:

1. A method of making a sequential optical coupling arrangement, comprising the steps of:

a) providing at least three optical fibers in close adjacent side-by side relationship b) fusing at least two of the optical fibers, fewer than the original number thereof, to form a first fused coupler, leaving at least one non-fused fiber juxtaposed to the fused fibers, the first fused coupler defining at least two input fiber ends and at least two output fiber ends, c) fusing only one of the output fiber ends with at least one of the non-fused fibers of step b) to form another sequential coupler.

2. The method of claim 1 wherein the at least one non-fused fiber undergoes heating and pulling together with the at least two fibers to be fused, the heating and pulling of the non-fused fiber resulting in an adiabatic taper.

3. The method of claim 1, further comprising the step of plaiting two or more fibers before fusing in steps b) and c).

4. The method of claim 1 wherein the fibers in step a) are spaced by $100\mu$–5 mm.

5. The method of claim 4 wherein the spacing is in the range of 125–400$\mu$.

6. A sequential optical coupler made by the method defined in claim 1.

7. A sequential optical coupler made by the method defined in claim 2.

8. A sequential optical coupler made by the method defined in claim 3.

9. A sequential optical coupler made by the method defined in claim 4.

10. A sequential optical coupler made by the method defined in claim 5.

11. A sequential optical coupler made by the method defined in claim 1, wherein the sequential optical coupler is a monolithic device.

12. A sequential coupler made by the method defined in claim 1, wherein at least one of the couplers is associated with an input/output fiber length with an adiabatic taper thereon.

13. A sequential coupler made be the method steps defined in claim 1, wherein at least one of the couplers is associated with an input/output fiber length with an adiabatic taper thereon, and, wherein the adiabatic taper is disposed substantially coextensively with an adjacent coupler.

* * * * *